E. G. UHL.
AUTOMATIC VEHICLE BRAKE.
APPLICATION FILED OCT. 28, 1910.
988,676.
Patented Apr. 4, 1911.
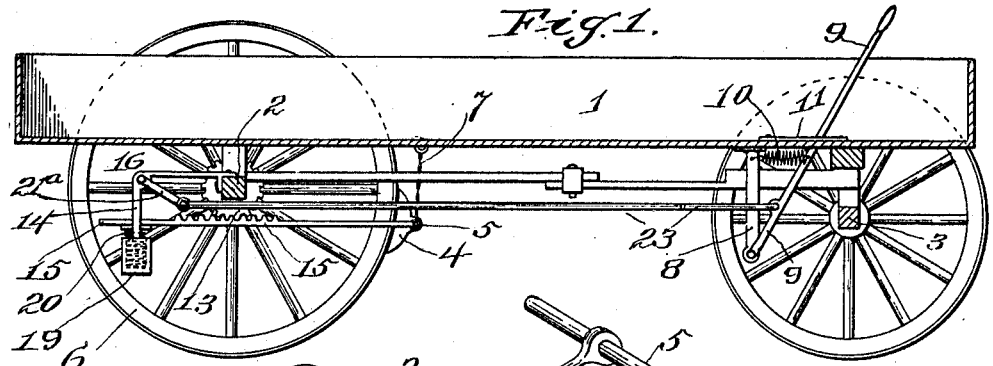
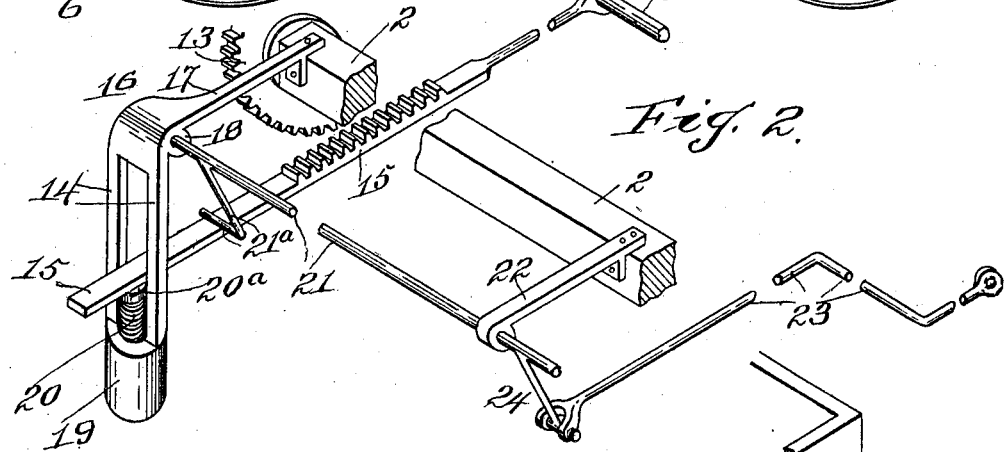
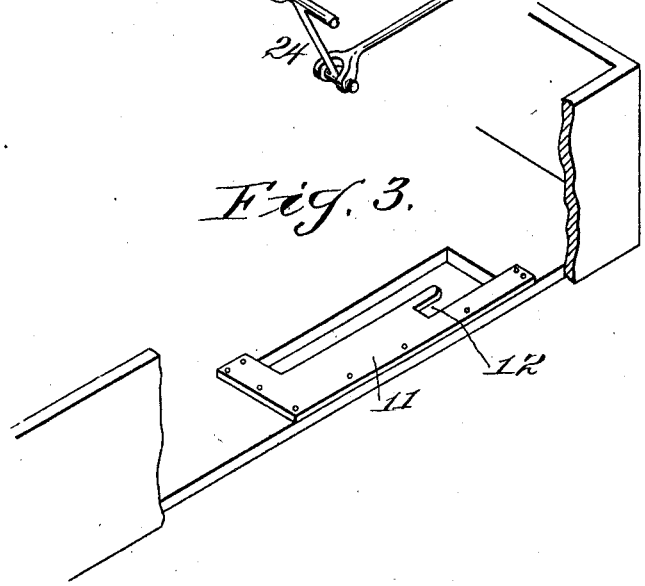
Witnesses
Wm E. Valk Jr.
C. T. Beck
Inventor
Edgar G. Uhl
W. H. Wills
Attorney

UNITED STATES PATENT OFFICE.

EDGAR G. UHL, OF SAN ANTONIO, TEXAS.

AUTOMATIC VEHICLE-BRAKE.

988,676.  Specification of Letters Patent.  Patented Apr. 4, 1911.

Application filed October 28, 1910. Serial No. 589,557.

*To all whom it may concern:*

Be it known that I, EDGAR G. UHL, citizen of the United States, residing at San Antonio, in the county of Bexar and State of Texas, have invented certain new and useful Improvements in Automatic Vehicle-Brakes, of which the following is a specification.

This invention relates to brakes, and pertains especially to vehicle brakes operated by a rack and pinion mechanism.

The object of the invention is to provide a brake mechanism applicable to vehicles of various character, and having such novel and peculiar construction and arrangement of parts as will afford a quick, positive and expeditious operation.

A further object of the invention is to provide a spring-controlled rack coöperating with a gear or pinion or a vehicle wheel, and special means for operating the rack in a braking or unbraking operation.

Various other objects, advantages and improved results are attainable in the practical construction and application of the invention, hereinafter to be fully described and set up in the claims to follow.

In the accompanying drawings forming a part of this application:—Figure 1 is a longitudinal sectional view of a wagon showing the application of the invention. Fig. 2 is a detail perspective view partly broken away. Fig. 3 is a detail perspective view showing means for holding the operating lever.

The same reference numerals denote the same parts throughout the several views of the drawings.

The wagon bed or body 1, rear and front axles 2 and 3 respectively, and the brake shoes 4, are of ordinary construction. The bar 5, to which the shoes 4 are attached for engagement with the rear wheels 6, is suspended from the bottom of the bed 1, by means of chains 7. The bed is provided with a depending bracket 8, to which is pivoted a hand lever 9, controlled by a spiral spring 10, and said lever projects through the bed bottom and is held in a forward position by means of a plate 11, secured to said bottom and having a notch 12, to catch and hold said lever. The connections between the lever 9 and the brake-bar will be hereinafter fully described.

Each rear wheel is provided upon its inner side with a gear or pinion 13, which is suitably secured to the wheel or to its hub. A toothed rack-bar 15, is provided for each pinion, and such bars have one end secured to the brake-bar 5, and the other end works through a hanger 16. Both of these hangers being of the same construction and arrangement only one of them will be herein described in detail. Such hanger comprises a bar 17, secured to the rear axle and projecting rearwardly therefrom and has a collar 18, and a pair of arms 14 depending from the collar and suspending a casing 19 for holding a spiral spring 20, and such pair of arms has a space or opening therebetween for the travel of the rack-bar which rides on a plate 20$^a$, secured to the upper end of the spring for keeping the bar in mesh with the pinions. A shaft 21 is journaled in the collars 18, and both ends of the shaft have a crank rod 21$^a$, which projects at right angles from the shaft over the rack-bars, and said shaft is journaled centrally in an arm 22 secured to and projecting from the rear axle. The shaft 21, is connected with the hand lever 9, by a connecting rod 23, which is connected to the shaft 21 by means of an arm 24 pivoted to the connecting rod 23. It is obvious that the parts or mechanism just described constitute the connections between the hand lever and the brake-bar, hereinbefore referred to.

In a braking operation, the hand lever is moved into the plate notch 12, and such movement operates the shaft 21, to turn its rods 21$^a$ out of contact with the rack-bars which under pressure of the springs 20, simultaneously mesh with the pinions as they are revolved by the revolution of the rear wheels until the rearward movement of the rack-bars pull the brake shoes into such engagement with the wheels as to stop or brake them. In order to release the brake, the hand lever is moved out of the notch or catch, and such movement throws the rods 21$^a$, downwardly against the rack bars and thereby disengages them with the pinions. The spring 10, holds the parts in such disengagement.

It will be seen that upon releasing the hand lever the braking operation is automatic, and that by fixing the lever the release of the brake is automatic.

It is obvious that various mechanical changes may be made in the practical construction and arrangement of the parts without departing from the spirit of the invention as covered by the claims now to follow.

Having thus described my invention what I claim as new and desire to secure by Letters Patent is:—

1. In an automatic vehicle brake, the combination, with pinions secured to and revolved by the vehicle wheels, and a pendant brake-bar having brake-shoes, of rack-bars attached to the brake-bar, and extending under the rear axle of the vehicle and adapted to mesh with the pinions for operating the brake-bar, a cushioned seat for the rack-bars, and means for depressing the rack-bars out of mesh with the pinions.

2. In an automatic vehicle brake, the combination, with pinions secured to and revolved by the vehicle wheels, and a pendant brake-bar having brake shoes, of rack-bars attached to the brake-bar, springs suspended from the rear axle of the vehicle and slidably supporting the rack-bars for keeping them in mesh with the pinions, means for moving the rack-bars out of mesh with the pinions, and a hand lever for controlling this movement of the rack-bars.

3. In an automatic vehicle brake, the combination, of pinions secured to and revolved by the vehicle wheels, and a pendant brake-bar having brake shoes, of rack-bars having one end attached to the brake-bar, hangers attached to and projecting from the rear axle of the vehicle and having the other end of the rack-bars working therethrough, a spiral spring carried by each hanger so that the rack-bars will ride thereon in engagement with the pinions, a shaft journaled in the hangers and having rods adapted to engage the rack-bars for disengaging them with the pinions, and a hand lever for operating the said shaft.

In witness whereof I hereunto set my hand in the presence of two witnesses.

EDGAR G. UHL.

Witnesses:
J. E. HARRIS,
O. W. GEYER.